United States Patent
Choi

(10) Patent No.: US 8,690,495 B2
(45) Date of Patent: Apr. 8, 2014

(54) CUTTING TOOL AND CUTTING INSERT FOR THE SAME

(75) Inventor: Chang Hee Choi, Daegu (KR)

(73) Assignee: TaeguTec, Ltd., Dalseong-gun, Daegu (KR)

( * ) Notice: Subject to any disclaimer, the term of this patent is extended or adjusted under 35 U.S.C. 154(b) by 349 days.

(21) Appl. No.: 13/377,373

(22) PCT Filed: Jun. 24, 2009

(86) PCT No.: PCT/KR2009/003415
§ 371 (c)(1),
(2), (4) Date: Dec. 9, 2011

(87) PCT Pub. No.: WO2010/143768
PCT Pub. Date: Dec. 16, 2010

(65) Prior Publication Data
US 2012/0093595 A1    Apr. 19, 2012

(30) Foreign Application Priority Data
Jun. 10, 2009 (KR) .................. 10-2009-0051617

(51) Int. Cl.
*B23B 27/00* (2006.01)
*B23C 5/22* (2006.01)
(52) U.S. Cl.
USPC ............ 407/107; 407/101; 407/102; 407/108
(58) Field of Classification Search
USPC ............. 407/67, 87, 101, 102, 107, 108, 110
See application file for complete search history.

(56) References Cited

U.S. PATENT DOCUMENTS

| 2,255,737 | A | * | 9/1941 | Severson ................. 407/96 |
| 3,578,742 | A | * | 5/1971 | Manthei ................. 407/101 |
| 5,011,340 | A | | 4/1991 | Pettersson et al. |
| 5,033,916 | A | | 7/1991 | Dunklau |
| 5,059,068 | A | | 10/1991 | Scott |

(Continued)

FOREIGN PATENT DOCUMENTS

| DE | 3437018 A1 | 4/1986 |
| GB | 1044625 | 10/1966 |

(Continued)

OTHER PUBLICATIONS

Official Action dated Mar. 20, 2013 issued in Chinese counterpart application (No. 200980159808.1) with translation.

(Continued)

*Primary Examiner* — Will Fridie, Jr.
(74) *Attorney, Agent, or Firm* — Womble Carlyle

(57) ABSTRACT

A cutting tool for machining large workpieces having relatively a large cutting amount and a cutting insert configured to be used with the cutting tool. The cutting tool includes a cutting insert and a wedge for clamping the cutting insert. The cutting insert has a polygonal top surface, which comprises a recessed portion having a plurality of inclined abutment surfaces which are inclined toward the center of the top surface. The outline of said recessed portion is twisted at a predetermined angle with respect to the outline of the top surface. The wedge includes a projecting portion that contacts the inclined abutment surface and pushes the cutting insert so that two side surfaces of the cutting insert can be supported by a radial inner side surface and a lateral supporting surface of an insert seat.

19 Claims, 7 Drawing Sheets

(56) References Cited

U.S. PATENT DOCUMENTS

| | | | |
|---|---|---|---|
| 5,395,186 A | 3/1995 | Qvart | |
| 5,803,674 A | 9/1998 | Satran et al. | |
| 6,234,727 B1 * | 5/2001 | Barazani | 407/117 |
| 6,280,122 B1 | 8/2001 | Qvarth | |
| 6,334,740 B1 | 1/2002 | Qvarth | |
| 6,543,970 B1 | 4/2003 | Qvarth et al. | |
| 6,607,335 B2 * | 8/2003 | Morgulis | 407/40 |
| 6,789,983 B2 | 9/2004 | Mizutani | |
| 8,033,764 B2 * | 10/2011 | Noggle | 407/113 |
| 2002/0001510 A1 | 1/2002 | Men | |
| 2007/0177951 A1 | 8/2007 | Sakamoto et al. | |
| 2007/0245535 A1 | 10/2007 | Noggle | |

FOREIGN PATENT DOCUMENTS

| | | |
|---|---|---|
| JP | 61-089419 U | 6/1986 |
| JP | 05-050321 A | 3/1993 |
| JP | 09-076111 | 3/1997 |
| JP | 11-010435 | 1/1999 |
| KR | 10-0485529 | 4/2005 |
| WO | 95/05913 | 3/1995 |
| WO | WO 2007/127109 | 11/2007 |

OTHER PUBLICATIONS

Search Report dated Mar. 20, 2013 issued in Chinese counterpart application (No. 200980159808.1).

Publication of Japanese counterpart application issued as JP Patent No. 5302458 (cited references listed on p. 10).

Extended European Search Report dated Oct. 18, 2012 issued in European counterpart application (No. 09845862.3).

International Search Report in PCT/KR2009/003415, dated May 31, 2010.

Written Opinion in PCT/KR2009/003415, dated May 31, 2010.

* cited by examiner

CUTTING TOOL AND CUTTING INSERT FOR THE SAME

RELATED APPLICATIONS

This is a 35 USC 371 U.S. National Phase of International Application No. PCT/KR2010/003415, filed 24 Jun. 2009 and published in English as WO 2010/143768 A1 on 16 Dec. 2010, which claims priority to KR 10-2009-0061617, filed 10 Jun. 2009. The contents of the aforementioned applications are incorporated by reference in their entirety.

TECHNICAL FIELD

The present invention relates to a cutting tool for machining large workpieces having relatively a large cutting amount and a cutting insert configured to be used with said cutting tool.

BACKGROUND ART

Cutting portions of cutting tools for machining metallic materials are easily worn out due to the friction occurring during machining. Thus, when the cutting portions are worn out, replacing only the worn cutting portions is absolutely advantageous in cutting operations. As such, in a cutting operation, a method of detachably mounting a replaceable cutting insert in the body of the cutting tool is generally used.

A clamping method of using a screw and a clamping method of using a wedge are typical examples of methods to clamp the cutting insert in the cutter body. The clamping method of using a screw is to form concentric screw holes in both the cutting insert and the insert seat, as well as to clamp a screw into both holes to secure the cutting insert in the cutting tool. It is the simplest clamping method. However, the method of clamping the cutting insert by using a screw is not so efficient when machining large workpieces such as a part of a vessel. This is because when separating the worn cutting insert from the cutting tool, the worker has to separate the cutting tool body from the machining equipment due to the difficulty in accessing the tool for disassembling the screw. Since the cutting tool body for machining large workpieces is generally large, separating the cutting tool from the machining equipment or mounting it on the machining equipment is very troublesome.

Thus, to machine the large workpieces, the workers prefer to use the wedge clamping method since there is no need to separate the tool body from the equipment when replacing the worn cutting insert. The cutting insert clamping structure, which uses the wedge, is disclosed in Korean Patent Laid-Open Publication No. 1996-703697. Present FIGS. 1 and 2 illustrate such cutting tool. A milling cutter 110 includes a plurality of slots 130, which are arranged at same intervals around the outer circumference of the cylindrical cutter body 111. An adapter seat 140 is recessed within one side surface 133 of the slot 130. A wedge 150 is received in the slot 130, while an adapter 160 is received in the adapter seat 140. A cutting insert 120 is seated and fixed on the top surface of the adapter 160. When the adapter 160, on which the cutting insert is seated, is mounted on the adapter seat 140, the top surface of the cutting insert contacts one side surface of the wedge 150. A screw 170 is clamped into a screw hole 172 of the slot 130 through a screw hole 171 of the wedge 150. As the screw 170 advances into the screw hole of the slot 130, the wedge 150 is pushed toward the screw hole of the slot 130. Since the wedge 150 tapers inwardly, the cutting insert 120 is clamped in the adapter 160 by the wedge 150 as the wedge 150 advances toward the screw hole of the slot 130. Disclosure of Invention

SUMMARY

In the prior art as discussed above, the contact portion between the cutting insert and the wedge is flat as shown in FIG. 2. The clamping force of the wedge is delivered to the cutting insert only in the direction perpendicular to the top surface of the cutting insert, not in the radial direction toward the center of the cutting tool. Thus, when the cutting insert is clamped by the wedge, the radial inner side surface 121 of the cutting insert is not sufficiently supported by the side surface of the adapter 160. As a result, the cutting insert may rotate on the adapter due to the reaction force caused by the cutting force. As such, it cannot be securely mounted in the cutting tool.

The objective of the present invention is to provide a cutting insert, which overcomes the above disadvantages, and a cutting tool designed to use such a cutting insert.

To achieve the above objective, the present invention provides a cutting tool comprising one or more cutting portions. Each of the one or more cutting portions include a cutting insert, a wedge for clamping the cutting insert, a slot formed in a body of the cutting tool and receiving the wedge, and an insert seat recessed within a side surface of the slot and receiving the cutting insert. The insert seat has a radial inner side surface, a bottom supporting surface on which the cutting insert is seated, and a lateral supporting surface outwardly extending from the radial inner side surface and the bottom supporting surface. The cutting insert has a polygonal top surface, a bottom surface supported by the bottom supporting surface of the insert seat, and a plurality of side surfaces connecting between the top surface and the bottom surface. The top surface of the cutting insert comprises a recessed portion having a plurality of surfaces inclined toward the center of the top surface of the cutting insert. The outline of said recessed portion is twisted at a twist angle α with respect to the outline of the top surface of the cutting insert. The wedge includes a projecting portion, which contacts the surface inclined toward the center of the top surface of the cutting insert and pushes the cutting insert. This is so that two side surfaces of the cutting insert can be supported by the radial inner side surface and the lateral supporting surface of the insert seat.

According to one embodiment of the present invention, the twist angle α is in the range of 10° to 30°.

According to one embodiment of the present invention, the surface inclined toward the center of the top surface of the cutting insert forms an angle in the range of 3° to 10° with respect to the bottom surface of the cutting insert.

According to one embodiment of the present invention, the one or more cutting portions further comprise a shim received between the cutting insert and the insert seat.

According to the present invention, the recessed portion of the top surface of the cutting insert is configured to mate with the projecting portion of the side surface of the wedge. The clamping force of the wedge can be delivered in the direction perpendicular to the top surface of the cutting insert as well as in the radial direction toward the center of the cutting tool (or in the direction perpendicular to the radial inner side surface of the insert seat). The wedge clamping force, which is delivered in the radial direction toward the center of the cutting tool, can have one side surface of the cutting insert supported by the radial inner side surface of the insert seat. This can prevent the rotation of the cutting insert on the insert seat due to the reaction force of the cutting force. As a result, the cutting insert can be more securely mounted in the cutting tool.

Further, according to the present invention, the outline of the recessed portion of the top surface of the cutting insert is twisted at a predetermined angle relative to the outline of the top surface. The wedge clamping force in the radial direction toward the center of the cutting tool can be divided into the force in the direction perpendicular to the radial inner side surface of the insert seat and the force in the direction perpendicular to the lateral supporting surface of the insert seat. The force in the direction perpendicular to the radial inner side surface of the insert seat can have one side surface of the cutting insert supported by the radial inner side surface of the insert seat. The force in the direction perpendicular to the lateral supporting surface of the insert seat can have the other side surface of the cutting insert supported by the lateral supporting surface of the insert seat. That is, since two side surfaces of the cutting insert contact two side surfaces of the insert seat, the cutting insert can be more securely clamped in the cutting tool.

DETAILED DESCRIPTION

In view of the accompanying drawings, the present invention will be described below in detail.

Figure 6:
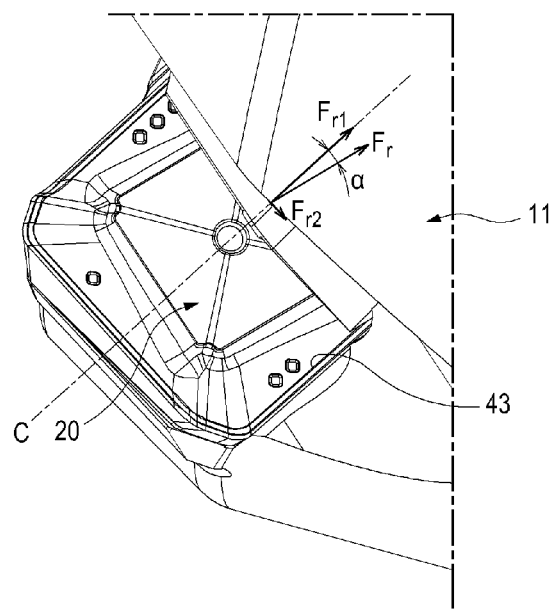
FIG. 6 illustrates wedge clamping forces working on the cutting insert according to the present invention.
Figure 7:
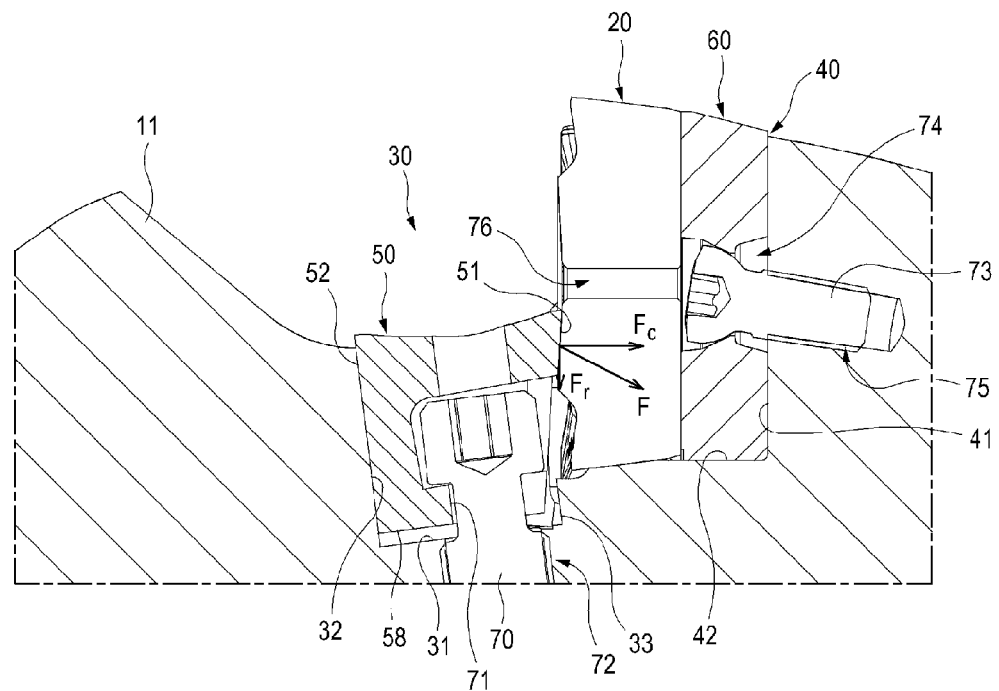
FIG. 7 is a cross-section view taken along the line A-A of FIG. 4.

FIGS. 3-6 are perspective views of a cutting tool according to the present invention. FIG. 7 is a cross-section view taken along the line A-A of FIG. 4. The cutting tool 10 comprises a plurality of slots 30, which are arranged at the same intervals around the outer circumference of the cylindrical cutter body 11. An insert seat 40 is recessed within a side surface 33 of the slot 30. The insert seat 40 includes a radial inner side surface 42 extending from the side surface 33 of the slot 30, a bottom supporting surface 41 on which the cutting insert or the shim is seated, and a lateral supporting surface 43 outwardly extending from the radial inner side surface 42 and the bottom supporting surface 41. The insert seat 40 has an axially and radially open shape so that the cutting insert 20 mounted on the insert seat 40 can perform the axial and radial cutting operation. Hereinafter, the "axial direction" of the cutting tool means the axial direction illustrated as 'X' in FIG. 3. Further, the "radial direction" refers to the direction headed from the center of the cutter body toward its periphery.

Figure 1:
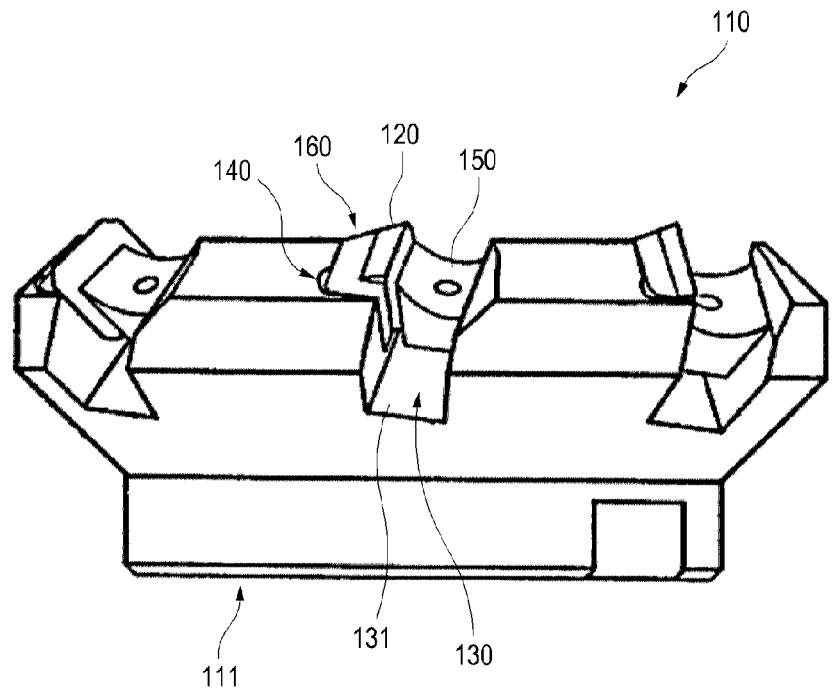
FIG. 1 is a perspective view of a cutting tool according to the prior art.
Figure 2:
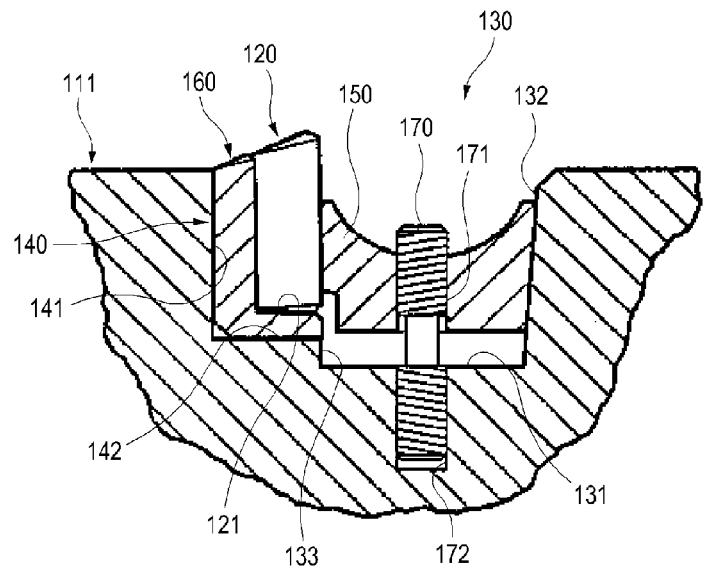
FIG. 2 is a cross-section view of the cutting tool according to the prior art.
Figure 3:
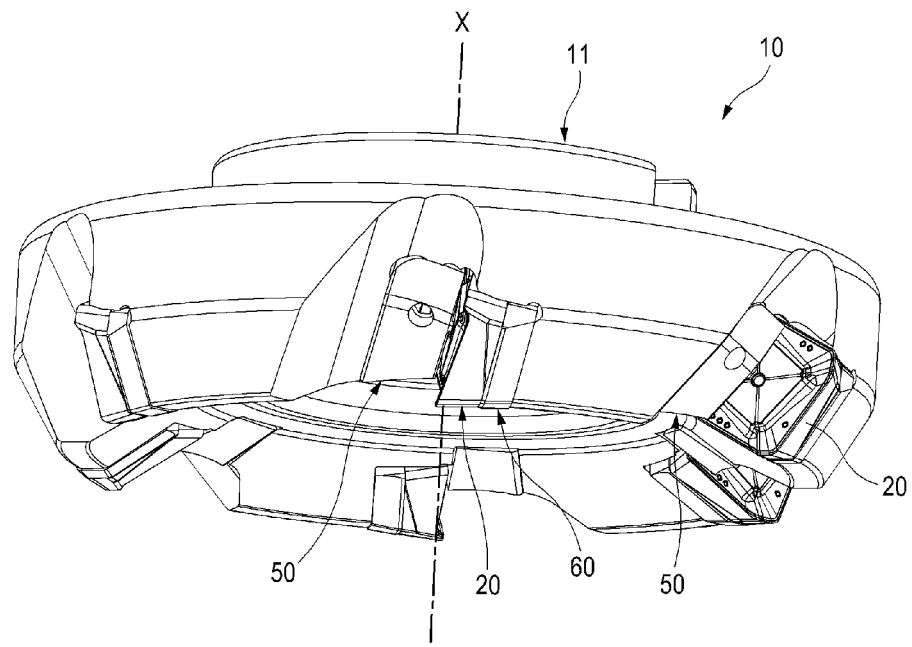
FIG. 3 is a perspective view of a cutting tool according to the present invention.
Figure 4:
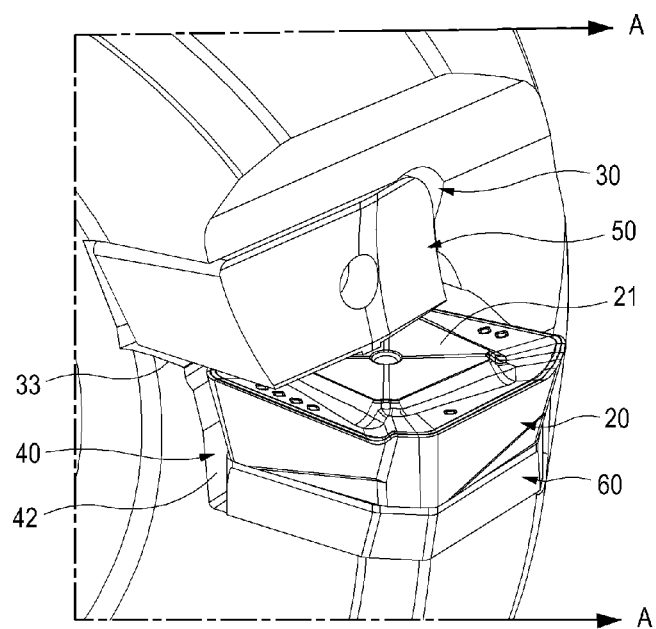
FIG. 4 illustrates the cutting tool when a cutting insert is clamped by a wedge according to the present invention.
Figure 5:
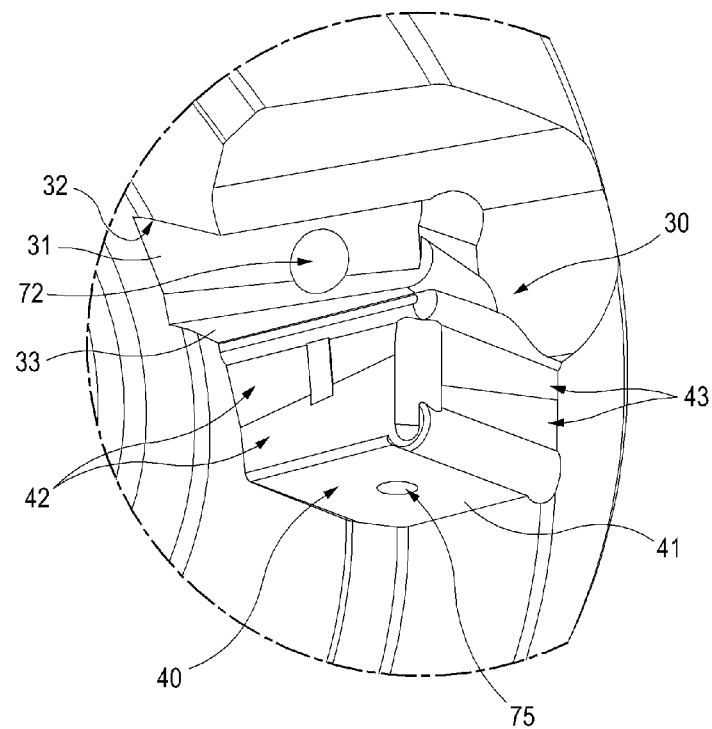
FIG. 5 illustrates the cutting tool having a slot in which the wedge is mounted and an insert seat on which the cutting insert is seated according to the present invention.
Figure 12:
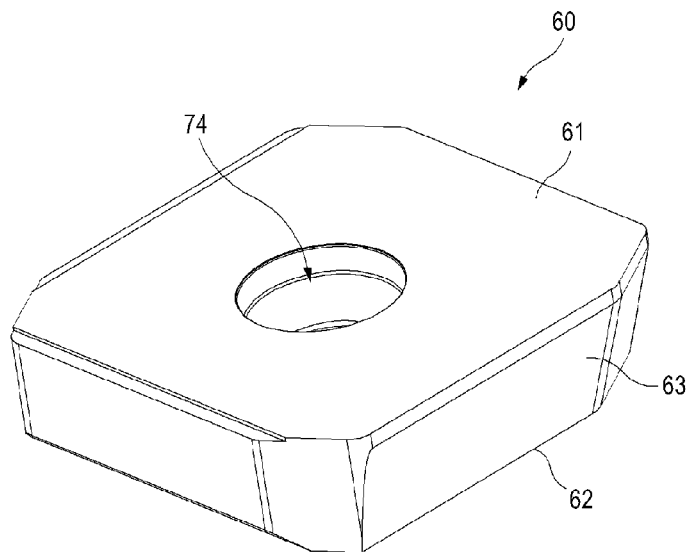
FIG. 12 is a perspective view of a shim according to the present invention.

As illustrated in FIG. 4, the wedge 50 is received in the slot 30 and the cutting insert is received in the insert seat 40. A shim 60 may be received between the cutting insert and the insert seat, as shown in FIG. 12. When the shim 60, on which the cutting insert is seated, is mounted on the insert seat 40, a top surface 21 of the cutting insert contacts a portion of a side surface 51 of the wedge 50. A screw 70 is clamped into a screw hole 72 of the slot 30 through a screw hole 71 of the wedge 50. As the screw 70 advances into the screw hole of the slot 30, the wedge 50 is pushed toward the screw hole of the slot 30. Since the wedge 50 tapers inwardly, the cutting insert 20 is clamped on the shim 60 or the insert seat 40 by the wedge 50 as the wedge 50 advances toward the screw hole of the slot 30.

Figure 8:
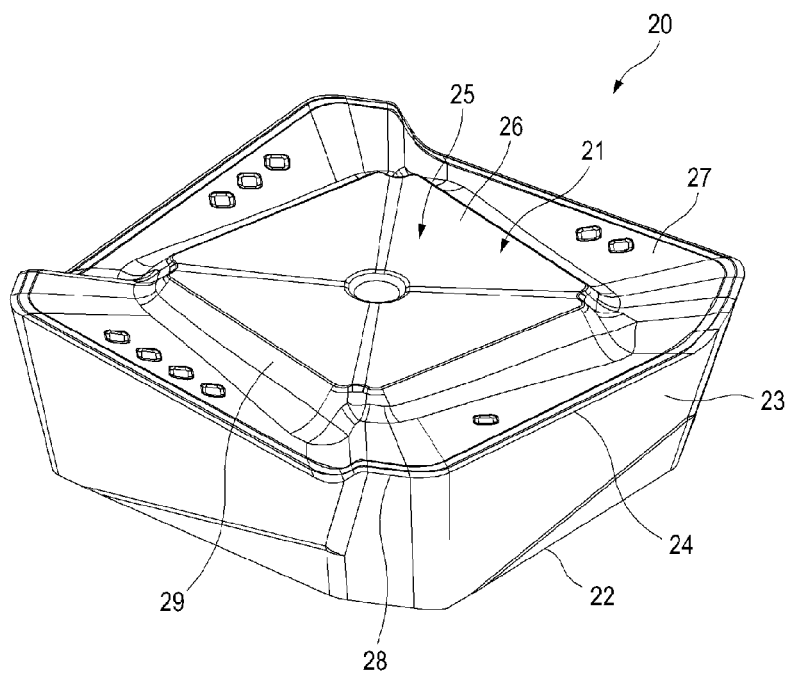
FIG. 8 is a perspective view of the cutting insert according to the present invention.
Figure 9:
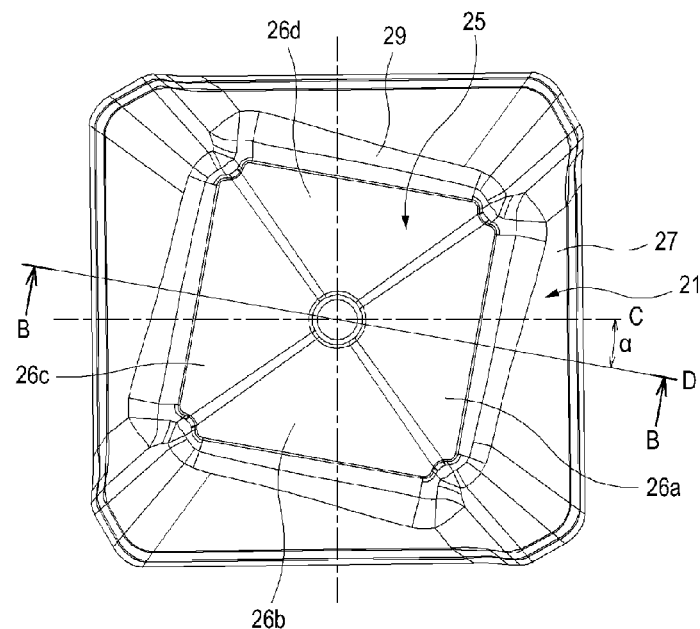
FIG. 9 is a top view of the cutting insert according to the present invention.
Figure 10:
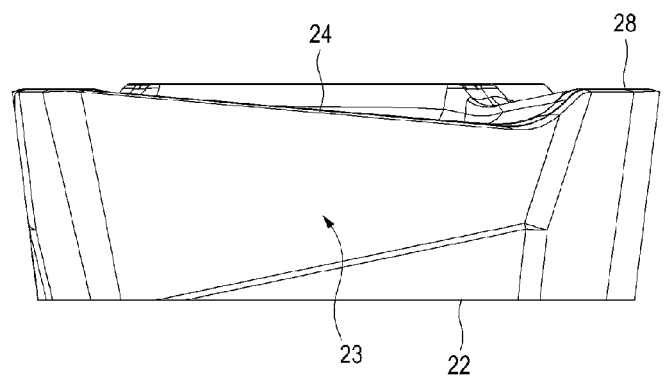
FIG. 10 is a side view of the cutting insert according to the present invention.
Figure 11:
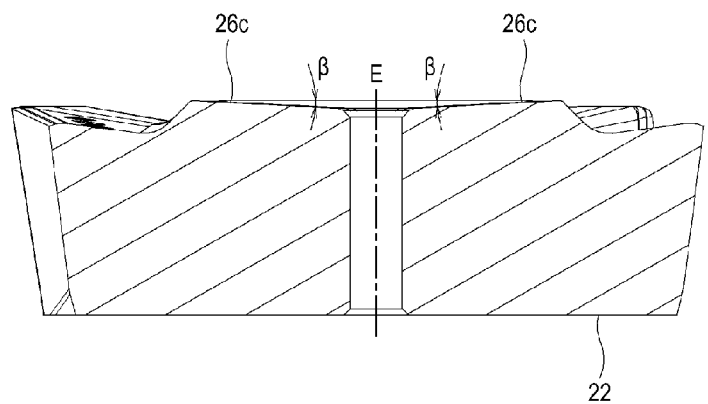
FIG. 11 is a cross-section view taken along the line B-B of FIG. 9.

FIG. 8 is a perspective view of the cutting insert according to the present invention. FIGS. 9 and 10 are respectively a top view and a side view of the cutting insert according to the present invention. FIG. 11 is a cross-section view taken along the line B-B of FIG. 9. The cutting insert 20 includes a top surface 21 contacting one side surface of the wedge, a bottom surface 22 supported and contacting a top surface 61 of the shim 60, and a plurality of side surfaces 23 connecting between the top surface 21 and the bottom surface 22. A portion of the plurality of side surfaces 23 of the cutting insert contacts the radial inner side surface 42 and the lateral supporting surface 43. The top surface 21 of the cutting insert is generally polygonal. In the present embodiment, however, it is generally square. As illustrated in FIG. 9, a square recessed portion 25 is formed on the top surface 21 of the cutting insert. The recessed portion 25 consists of triangular surfaces 26 inclined toward the center of the top surface of the cutting insert. The triangular surfaces are of the same number as the lines of the top surface 21 of the cutting insert. In the present embodiment, the recessed portion 25 includes four surfaces 26a, 26b, 26c, and 26d inclined toward the center of the top surface of the cutting insert. A through hole may be formed along the center line E. As shown in FIG. 11, the four surfaces 26a, 26b, 26c, and 26d inclined toward the center of the top surface of the cutting insert are formed at an inclination angle β relative to the bottom surface 22. The inclination angle β is preferably in the range of 3° to 10°. The surface 26 inclined toward the center of the top surface contacts the side surface of the wedge 50 when the cutting insert is mounted on the insert seat.

As illustrated in FIG. 9, the recessed portion 25 is formed to be twisted with respect to the top surface 21 of the cutting insert. That is, the line D bisecting the recessed portion symmetrically is rotated at a twist angle α relative to the line C bisecting the top surface 21 symmetrically. The twist angle α is preferable in the range of 10° to 30°. The top surface 21 of the cutting insert has a plurality of main cutting edges 24 and a plurality of auxiliary cutting edges 28. A transition portion 29 is formed between a rake portion 27 and the recessed portion 25.

Figure 13:
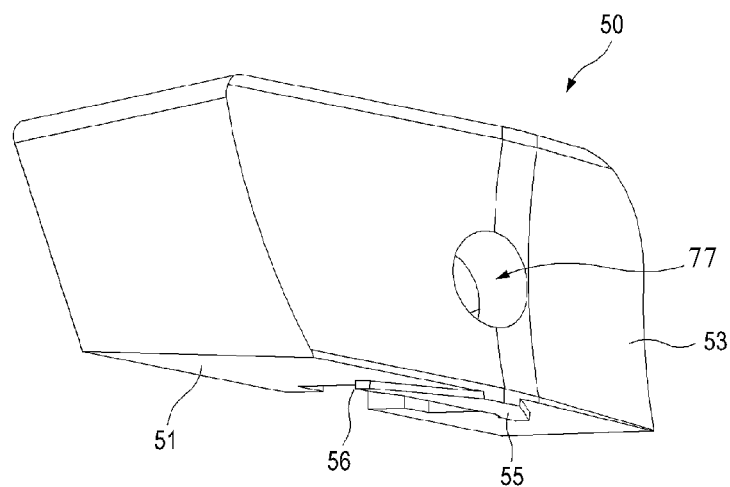
FIG. 13 is a perspective view of the wedge according to the present invention.
Figure 14:
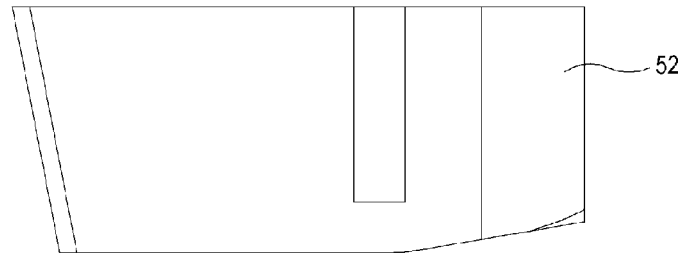
FIG. 14 is a top view of the wedge according to the present invention.
Figure 15:
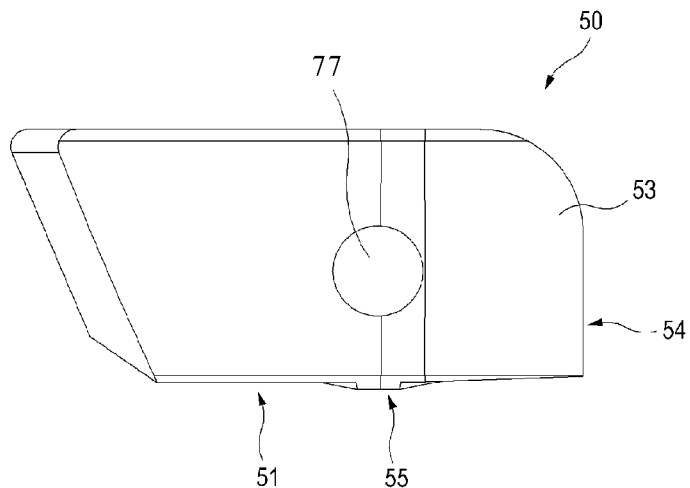
FIG. 15 is a front view of the wedge according to the present invention.
Figure 16:
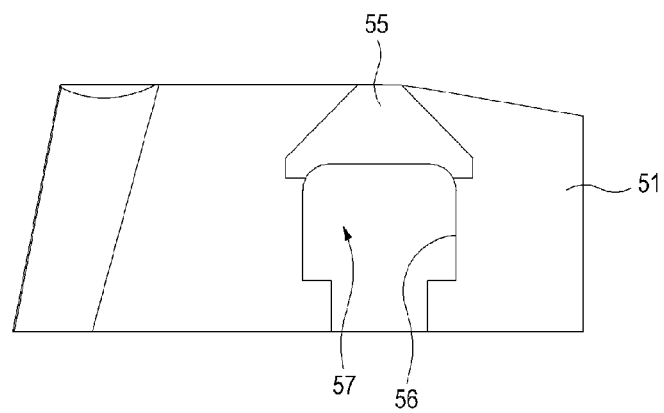
FIG. 16 is a bottom view of the wedge according to the present invention.
Figure 17:
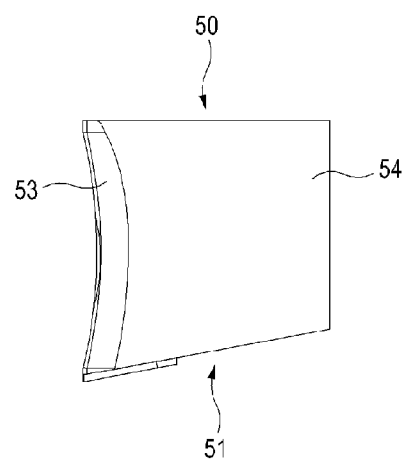
FIG. 17 is a side view of the wedge according to the present invention.

FIG. 13 is a perspective view of the wedge according to the present invention. FIGS. 14-17 are respectively a top view, a front view, a bottom view and a side view of the wedge according to the present invention. The wedge 50 includes a top surface 53 exposed in the radial direction of the cutting tool, a first side surface 51 having a projecting portion 55 that contacts the recessed portion 25 of the top surface 21 of the cutting insert, a second side surface 52 disposed opposite to the first side surface 21 and contacts the side surface 32 of the slot 30 when mounting it on the cutting tool. A hollow portion 57 is formed at the center of the wedge 50. The hollow portion 57 communicates with the upper hole 77 formed at the top surface 53 of the wedge and a lateral hole 56 formed at the first side surface 51. Further, a screw hole 71, into which the screw 70 is clamped, is formed at the bottom surface 58, as shown in FIG. 7. The projecting portion 55 of the first side surface 51 of the wedge is substantially configured to correspond to the inclined surface 26 of the recessed portion 25 of the top surface 21 of the cutting insert.

The clamping structure of the cutting tool and the cutting insert of the present invention will be described below in detail.

As illustrated in FIG. 7, the shim 60 is seated on the insert seat 40. The shim 60 is fixed on the insert seat 40 by the thread engagement between the shim screw 73 and the shim screw hole 74. The cutting insert 20 is seated on the top surface 61 of the shim 60. Two side surfaces 23 of the cutting insert contact the radial inner side surface 42 and the lateral supporting surface 43 of the insert seat 40. The wedge 50 is inserted into the slot 30. The wedge screw 70 is threaded into the screw hole formed at the bottom surface 31 of the slot 30 through the screw hole 71 of the bottom surface of the wedge. The wedge screw 70 consists of a head portion, a neck portion and a threaded portion. The head portion of the wedge screw is placed in the hollow portion 57 of the wedge 50. The neck portion is located in the screw hole 71. As the wedge screw 70 advances toward the screw hole 72, the projecting portion 55 of the first side surface 51 of the wedge contacts the inclined surface 26 of the recessed portion 25 of the top surface 21 of the cutting insert, thus pushing the cutting insert 20 circumferentially. As such, the cutting insert 20 is securely mounted in the cutting tool 10.

As illustrated in FIGS. 13-16, since the projecting portion 55 of the wedge has a shape corresponding to the inclined surface 26 of the recessed portion 25 of the cutting insert, the engagement between the projecting portion of the wedge and the inclined surface of the cutting insert can precisely set the mounting position of the cutting insert at the cutting tool. That is, the engagement between the projecting portion of the wedge and the inclined surface of the cutting insert functions to guide the mounting position of the cutting insert. In the prior art, since the contact surfaces of the wedge and cutting insert are all flat, there are some difficulties in setting the engagement position of the wedge and the cutting insert. In some cases, the prior art cutting insert may be mounted in the cutting tool in a slightly twisted state, and thus, the worker may not cut the workpiece precisely. In the present invention, since the engagement between the projecting portion of the wedge and the recessed portion of the cutting insert guides the mounting position of the cutting insert, the cutting insert can be positioned at the cutting tool simply and precisely.

Further, the inclined surface 26 of the cutting insert is inclined at the inclination angle $\beta$ with respect to the bottom surface 22. When the wedge clamps the cutting insert, the projecting portion 55 of the wedge puts a circumferential force Fc on the cutting insert 20 circumferentially, as well as a radial force Fr in the radial direction. The radial force Fr of the wedge can have the side surface 23 of the cutting insert more securely supported by the radial inner side surface 42 of the insert seat. As such, the cutting insert 20 can be more securely mounted at the cutting tool. The inclination angle $\beta$ is preferably in the range of 3° to 10°. If the inclination angle $\beta$ is less than 3°, then the wedge cannot sufficiently push the cutting insert in the radial direction. If it is greater than 10°, then it is difficult to detach or mount the wedge.

The recessed portion 25 of the cutting insert consists of the inclined surfaces 26, which are of the same number of the lines of the top surface 21 of the cutting tool. That is, where the top surface 21 of the cutting insert is a square as it is in the present embodiment, the recessed portion 25 has four inclined surfaces 26a, 26b, 26c and 26d. When the inclined surface 26a is clamped by the projecting portion 55 of the wedge and then the main cutting edge 24 opposite to the inclined surface 26a are worn out, after detaching the cutting insert, the worker can mount the cutting insert again so that the other inclined surface can be clamped by the projecting portion 55 of the wedge.

Further, the recessed portion 25 may be twisted at a predetermined angle relative to the top surface 21 of the cutting insert. Since the projecting portion 55 of the wedge has the shape corresponding to the inclined surface 26 of the cutting insert, the wedge 50 is mounted in the slot 30 in the direction parallel with the bisecting line D of the recessed portion 25 of the cutting insert. As illustrated in FIG. 6, the radial force Fr of the wedge is divided into a force component $Fr_1$ in the direction of the bisecting line C of the top surface 21 and a force component $Fr_2$ in the direction perpendicular to the bisecting line C. The force component $Fr_1$ has the side surface 23 of the cutting insert supported by the radial inner side surface 42 of the insert seat. The force component $Fr_2$ has the side surface 23 of the cutting insert supported by the lateral supporting surface 43 of the insert seat. Since the cutting insert is supported by the radial inner side surface 42, the lateral supporting surface 43, the shim or the bottom surface 41 of the insert seat, and the projecting portion 55 of the wedge, it can be more securely mounted. The twist angle $\alpha$ is preferably in the range of 10° to 30°. If the twist angle $\alpha$ is less than 10°, then the cutting insert is not stably supported by two side surfaces of the insert seat. If it is greater than 30°, since many portions of the top surface of the cutting insert contact the wedge, it is hard to ensure sufficient chip discharging spaces.

It will be apparent to those skilled in the art that various modifications and variations can be made in the present invention without departing from the spirit or scope of the invention. Further, the present invention can be used in various machine work using a cutting insert such as hole processing and turning operations.

The invention claimed is:
1. A cutting tool, comprising:
one or more cutting portions including a cutting insert, a wedge for clamping the cutting insert, a slot formed in a body of the cutting tool and receiving the wedge, and an insert seat recessed within a side surface of the slot and receiving the cutting insert;
said insert seat having a radial inner side surface, a bottom supporting surface on which the cutting insert is seated, and a lateral supporting surface outwardly extending from the radial inner side surface and the bottom supporting surface, said cutting insert having a polygonal top surface, a bottom surface supported by the bottom supporting surface of the insert seat, and a plurality of side surfaces connecting between the top surface and the bottom surface, wherein the top surface of the cutting insert comprises a recessed portion having a plurality of inclined abutment surfaces which are inclined toward the center of the top surface of the cutting insert, an outline of said recessed portion being twisted at a twist angle α with respect to an outline of the top surface of the cutting insert, and wherein the wedge includes a projecting portion that contacts one of the inclined abutment surfaces and pushes the cutting insert so that two side surfaces of the side surfaces of the cutting insert can be supported by the radial inner side surface and the lateral supporting surface of the insert seat.

2. The cutting tool according to claim 1, wherein the twist angle α is in the range of 10° to 30°.

3. The cutting tool according to claim 1, wherein each of the inclined abutment surfaces forms an angle in the range of 3° to 10° with respect to the bottom surface of the cutting insert.

4. The cutting tool according to claim 3, wherein each of said one or more cutting portions further comprises a shim received between the cutting insert and the insert seat.

5. A cutting insert seated on an insert seat of a cutting tool and clamped by a wedge having a projecting portion on a side surface thereof, comprising:
a polygonal top surface;
a bottom surface supported by a bottom supporting surface of the insert seat; and
a plurality of side surfaces connecting between the top surface and the bottom surface,
wherein the top surface comprises a recessed portion having a plurality of inclined abutment surfaces which are inclined toward the center of the top surface of the cutting insert, an outline of said recessed portion being twisted at a twist angle α with respect to an outline of the top surface,
wherein the plurality of inclined abutment surfaces are configured such that when the projecting portion of the wedge contacts and pushes one of the inclined abutment surfaces, two side surfaces of the side surfaces of the cutting insert can be supported by a radial inner side surface and a lateral supporting surface of the insert seat.

6. The cutting insert according to claim 5, wherein the twist angle α is in the range of 10° to 30°.

7. The cutting insert according to claim 6, wherein each of the inclined abutment surfaces forms an angle in the range of 3° to 10° with respect to the bottom surface.

8. The cutting insert according to claim 5, wherein each of the inclined abutment surfaces forms an angle in the range of 3° to 10° with respect to the bottom surface.

9. The cutting tool according to claim 1, wherein each of said one or more cutting portions further comprises a shim received between the cutting insert and the insert seat.

10. The cutting tool according to claim 2, wherein each of said one or more cutting portions further comprises a shim received between the cutting insert and the insert seat.

11. A cutting insert having a center line (E) about which the cutting insert is rotationally indexable, the cutting insert comprising:
a polygonal top surface having a plurality of main cutting edges;
a bottom surface that is different in appearance from the top surface; and
a plurality of side surfaces connecting between the top surface and the bottom surface;
wherein:
the top surface comprises a recessed portion having a plurality of inclined abutment surfaces which are inclined toward a center of the top surface;
an outline of the recessed portion is twisted at a twist angle α in the range of 10° to 30° with respect to an outline of the top surface; and
the number of inclined abutment surfaces in the recessed portion is equal to the number of main cutting edges.

12. The cutting insert according to claim 11, wherein each inclined abutment surface forms an angle in the range of 3° to 10° with respect to the bottom surface.

13. The cutting insert according to claim 11, wherein each of the plurality of inclined abutment surfaces has a triangular shape.

14. The cutting insert according to claim 11, wherein the plurality of inclined abutment surfaces are identical to one another.

15. The cutting insert according to claim 11, wherein each of the inclined abutment surfaces is spaced apart from an adjacent main cutting edge by a transition surface.

16. The cutting insert according to claim 11, wherein, in a cross-sectional view symmetrically bisecting the recessed portion, the inclined abutment surfaces form the highest portion of the top surface proximate the transition surfaces.

17. The cutting insert according to claim 11, further comprising a though hole formed along the center line (E).

18. The cutting insert according to claim 11, wherein:
each inclined abutment surface forms an angle in the range of 3° to 10° with respect to the bottom surface;
each of the plurality of inclined abutment surfaces has a triangular shape;
each of the inclined abutment surfaces is spaced apart from an adjacent main cutting edge by a transition surface; and
in a cross-sectional view symmetrically bisecting the recessed portion, the inclined abutment surfaces form the highest portion of the top surface proximate the transition surfaces.

19. A cutting tool having an axis of rotation (X) and comprising:
a cutter body provided with a plurality of slots arranged at the same intervals around an outer circumference thereof;
a wedge received in each slot, the wedge having a projecting portion;
an insert seat formed in a side surface of each slot, the insert seat having a radial inner side surface, a bottom supporting surface and a lateral supporting surface outwardly extending from the radial inner side surface and the bottom supporting surface; and
a cutting insert received in each slot and clamped by the wedge, with the insert's bottom surface in abutment with insert seat's bottom supporting surface; wherein:
the cutting insert is in accordance with the cutting insert of claim 11; and
the wedge's projecting portion contacts one of the cutting insert's inclined abutment surfaces and pushes the cutting insert so that two of said plurality of side surfaces of the cutting insert are supported by the radial inner side surface and the lateral supporting surface of the insert seat.

* * * * *